United States Patent
Nakahara

(10) Patent No.: US 9,377,606 B2
(45) Date of Patent: Jun. 28, 2016

(54) ZOOM LENS AND IMAGE PICKUP DEVICE INCLUDING THE SAME

(71) Applicant: CANON KABUSHIKI KAISHA, Tokyo (JP)

(72) Inventor: Makoto Nakahara, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 65 days.

(21) Appl. No.: 14/258,655

(22) Filed: Apr. 22, 2014

(65) Prior Publication Data

US 2014/0320976 A1    Oct. 30, 2014

(30) Foreign Application Priority Data

Apr. 25, 2013  (JP) ................................ 2013-092174
Apr. 10, 2014  (JP) ................................ 2014-081262

(51) Int. Cl.
*G02B 15/14* (2006.01)
*G02B 15/177* (2006.01)
*G02B 15/22* (2006.01)

(52) U.S. Cl.
CPC .............. *G02B 15/177* (2013.01); *G02B 15/22* (2013.01)

(58) Field of Classification Search
CPC ................................ G02B 15/177; G02B 15/22
See application file for complete search history.

(56) References Cited

U.S. PATENT DOCUMENTS

| 5,059,006 | A | 10/1991 | Kikuchi et al. |
| 7,777,967 | B2 | 8/2010 | Hirakawa |
| 2006/0268426 | A1 | 11/2006 | Arimoto et al. |
| 2007/0139787 | A1 | 6/2007 | Kim |
| 2009/0290227 | A1 | 11/2009 | Izuhara et al. |

FOREIGN PATENT DOCUMENTS

| CN | 101666906 A | 2/2012 |
| CN | 101666906 B | 2/2012 |
| CN | 101794013 B | 3/2012 |
| EP | 2693251 A2 | 2/2014 |
| JP | 07-306362 A | 11/1995 |
| JP | 2001-343584 A | 12/2001 |

(Continued)

OTHER PUBLICATIONS

European Partial Search Report issued in corresponding application No. 14165818.7 on Jul. 18, 2014.

(Continued)

*Primary Examiner* — Joseph P Martinez
(74) *Attorney, Agent, or Firm* — Carter, DeLuca, Farrell & Schmidt, LLP

(57) ABSTRACT

A zoom lens includes, in order from an object side to an image side: first and second lens units having negative and positive refractive powers, respectively; a middle lens group; and a final lens unit having a positive refractive power, wherein the middle lens group comprises a focus lens unit that has a negative refractive power and moves toward the image side during focusing from infinity to a short distance, the intervals between adjacent lens units vary during at least one of zooming and focusing, and wherein the focal length $f_{img}$ of the final lens unit, the focal length $f_f$ of the focus lens unit, and the focal length $f_w$ of the entire system at the wide angle end are appropriately configured.

16 Claims, 9 Drawing Sheets

(56) References Cited

FOREIGN PATENT DOCUMENTS

| | | | | |
|---|---|---|---|---|
| JP | 2003215451 A | 7/2003 | | |
| JP | 2006-58584 A | 3/2006 | | |
| JP | 2012-027262 A | 2/2012 | | |
| JP | 2013-050674 | * | 3/2013 | ............ G02B 15/20 |
| JP | 2013050674 A | 3/2013 | | |

OTHER PUBLICATIONS

European Search Report issued in corresponding application No. 14165818.7 on Nov. 26, 2014.

Chinese Office Action issued in corresponding application No. CN201410169546.X on Nov. 30, 2015.

* cited by examiner

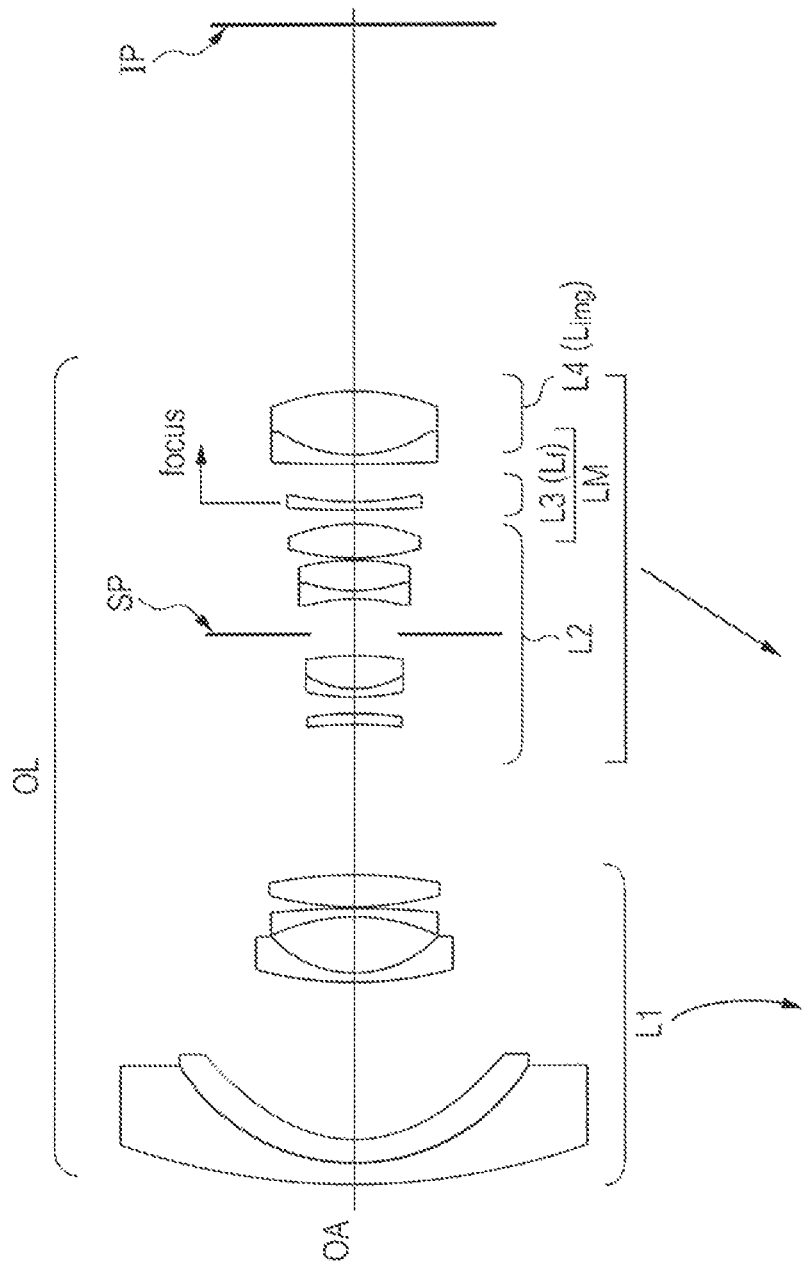

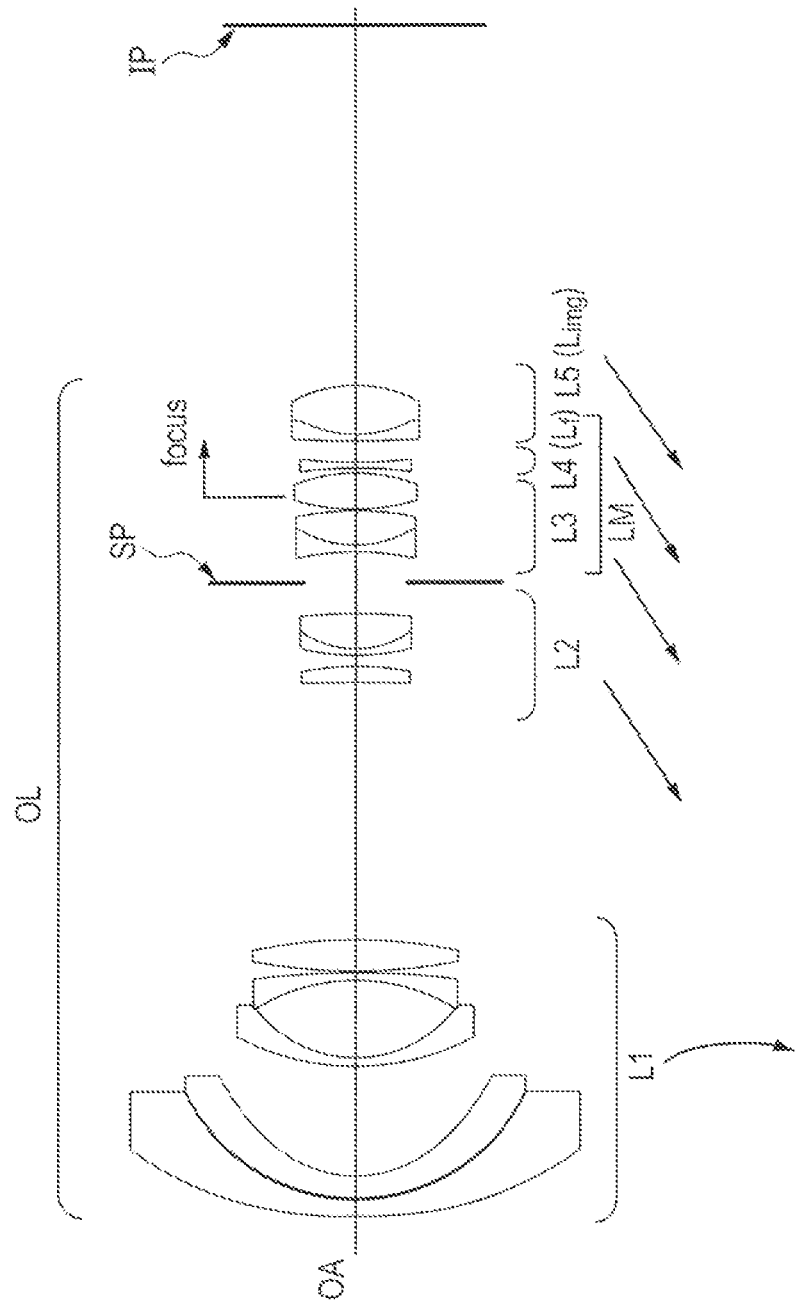

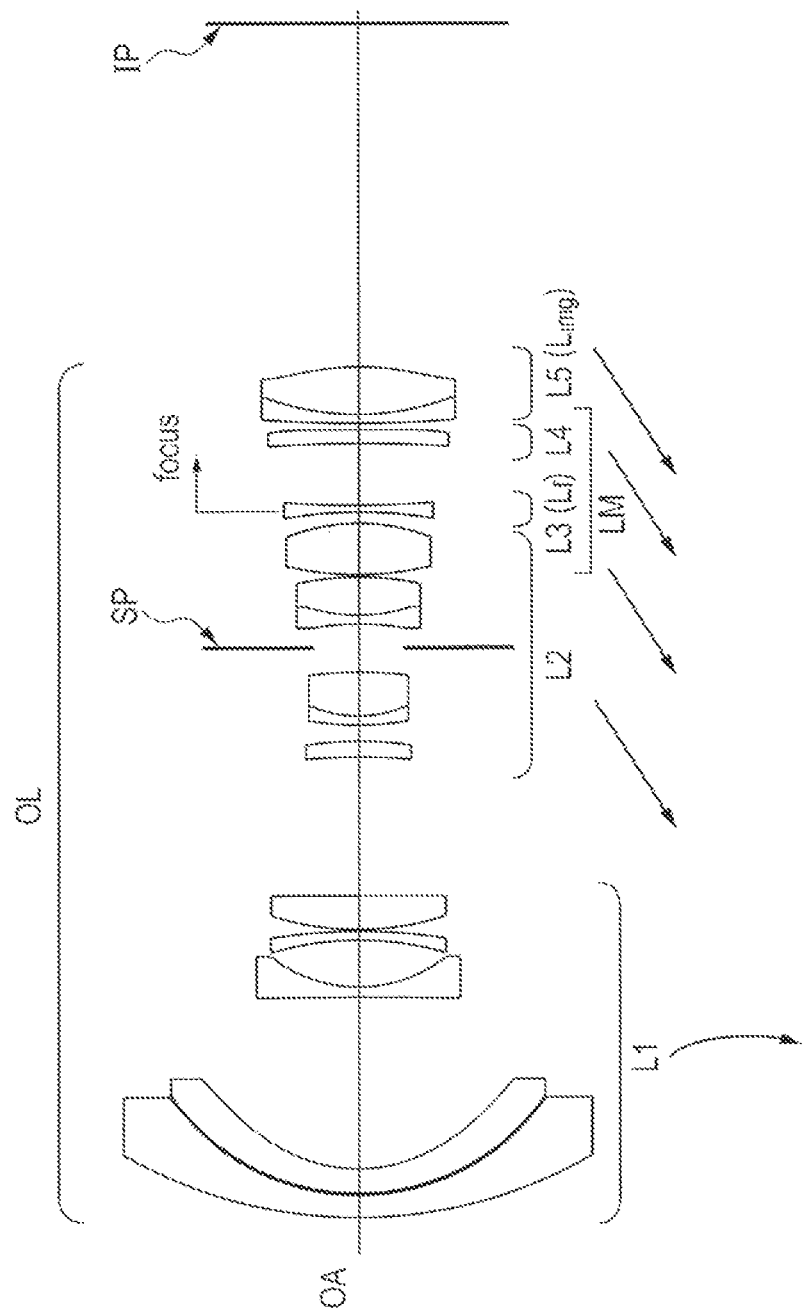

ZOOM LENS AND IMAGE PICKUP DEVICE INCLUDING THE SAME

BACKGROUND OF THE INVENTION

1. Field of the Invention

The present invention relates to a zoom lens and, for instance, is suitable for image pickup optical systems of image pickup devices, such as a video camera, a digital camera, a TV camera, a monitoring camera and a silver halide film camera.

2. Description of the Related Art

An image pickup optical system adopted in an image pickup device is desirably a small zoom lens that has a wide angle of view and high optical performance over the entire zoom range to support wider imaging conditions. As a zoom lens which is small in its entire system and facilitates achieving a wide angle of view, a negative-lead type zoom lens has been known which includes a lens unit having a negative refractive power arranged nearest to an object. As a negative-lead type wide angle of view zoom lens, a four-unit zoom lens has been known which includes, in order from an object side to an image side, lens units having negative, positive, negative and positive refractive powers, and changes the intervals between adjacent lens units for zooming.

In this four-unit zoom lens, a first lens unit and a second lens unit constitute a lens group having a positive refractive power as a whole at a telephoto end zoom position, and the entire optical system can be a telephoto type. Accordingly, the focal length at the telephoto end can be increased. An inner focus type four-unit zoom lens has been known which has a focus lens unit arranged on the image side to achieve reduction in size and weight of the focus lens unit in the four-unit zoom lens. For instance, such lenses are disclosed in Japanese Patent Application Laid-Open No. 2006-58584, U.S. Pat. No. 7,777,967 and Japanese Patent Application Laid-Open No. 2001-343584.

Furthermore, a five-unit zoom lens has been known which includes first to fifth lens units having negative, positive, positive, negative and positive refractive powers, respectively, in order from the object side to the image side, and moves each lens unit for zooming. For instance, such a lens is disclosed in Japanese Patent Application Laid-Open No. H07-306362.

A negative-lead type zoom lens has a lens configuration asymmetry with respect to an aperture stop. Accordingly, correction of various aberrations is difficult. For instance, variation in aberration during focusing is large. It is thus difficult to achieve high optical performance.

In particular for high speed focusing, an inner focus type which uses a small and lightweight lens unit nearer to the image than a first lens unit to achieve focusing has a tendency to increase variation in aberration during focusing. To achieve a wide angle of view as well as reduction in size and high speed focusing a small and lightweight lens unit with respect to the four-unit zoom lenses and five-unit zoom lenses described above, it is important to appropriately configure the refractive powers and lens configurations of the lens units.

For instance, if the refractive powers of the focus lens unit and the final lens unit are not appropriately configured, it becomes difficult to achieve reduction in size of the entire system while achieving a wide angle of view and high optical performance over the entire zoom range and performing high speed focusing. In addition, large variation in imaging magnification during focusing unfavorably varies an area reflected in an image pickup range during focusing. In particular, while a moving image is being taken, a background object comes into and goes out of a frame during focusing in a process of focusing a subject. Since the variation can be easily observed, which is unfavorable.

Furthermore, particularly, a zoom lens having a wide angle of view typically has a higher depth of field than a telephoto lens has. Accordingly, a subject is not easily blurred, thereby unfavorably making the variation prominent. It is therefore important that the variation in imaging magnification during focusing is small.

SUMMARY OF THE INVENTION

A zoom lens includes, in order from an object side to an image side: a first lens unit having a negative refractive power; a second lens unit having a positive refractive power; a middle lens group including at least one lens unit; and a final lens unit having a positive refractive power, wherein the middle lens group includes a focus lens unit that has a negative refractive power and moves toward the image side during focusing from infinity to a short distance, intervals between adjacent lens units vary during at least one of zooming and focusing, and wherein conditional expressions $$3.5 < f_{img}/f_w < 10.0$$

$$-5.0 < f_f/f_w < -1.0$$

are satisfied where a focal length of the final lens unit is $f_{img}$, a focal length of the focus lens unit is $f_f$, and a focal length of an entire system at a wide angle end is $f_w$.

Further features of the present invention will become apparent from the following description of exemplary embodiments with reference to the attached drawings.

BRIEF DESCRIPTION OF THE DRAWINGS

FIG. 3 is a lens sectional view of a zoom lens of Embodiment 2 at the wide angle end.

FIG. 5 is a lens sectional view of a zoom lens of Embodiment 3 at the wide angle end.

FIG. 7 is a lens sectional view of a zoom lens of Embodiment 4 at the wide angle end.

DESCRIPTION OF THE EMBODIMENTS

Preferred embodiments of the present invention will now be described in detail in accordance with the accompanying drawings.

A zoom lens of the present invention includes, in order from an object side to an image side: a first lens unit having a negative refractive power; a second lens unit having a positive refractive power; a middle lens group including at least one lens unit; and a final lens unit having a positive refractive power.

The middle lens group includes a focus lens unit that has a negative refractive power and moves toward the image during focusing from infinity to a short distance. The intervals between adjacent lens units vary during at least one of zooming and focusing. An aperture stop is arranged on an object side of the focus lens unit. The focus lens unit is made up of one negative lens. The final lens unit has at least one aspheric surface.

FIGS. 1, 3, 5 and 7 are lens sectional views of zoom lenses according to respective Embodiments 1 to 4 of the present invention at a wide angle end. FIGS. 2A, 2B, 4A, 4B, 6A, 6B, 8A and 8B are longitudinal aberration diagrams of the zoom lenses according to respective Embodiments 1 to 4 of the present invention. In these aberration diagrams, A and B are longitudinal aberration diagrams during focusing infinity at a wide angle end (short focal length end) and a telephoto end (long focal length end), respectively.

Figure 9:
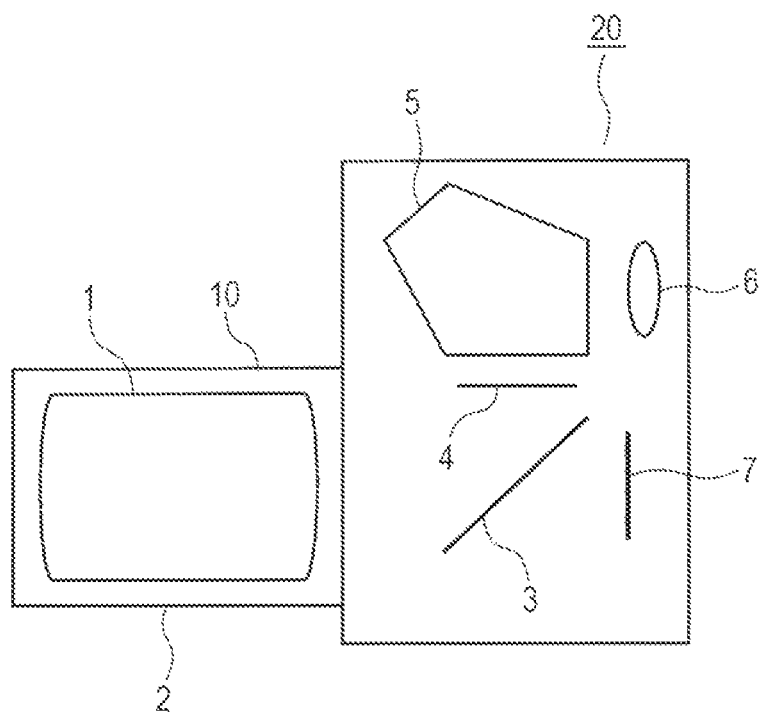
FIG. 9 is a schematic diagram of principal parts of an image pickup device of the present invention.

FIG. 9 is a schematic diagram of principal parts of a camera (image pickup device) including a zoom lens of the present invention. The zoom lens of each embodiment is an imaging lens system adopted in an image pickup device, such as a video camera, a digital camera or a silver halide film camera.

In the lens sectional views, the left is an object side (front), and the right is an image side (rear). The lens sectional views illustrate a zoom lens OL. Li denotes an i-th lens unit, where i denotes an order from an object side. The diagrams illustrate a focus lens unit $L_f$ and a final lens unit $L_{img}$ arranged nearest to the image. The diagrams also illustrate an aperture stop SP. A middle lens group LM includes at least one lens unit.

An image plane IP corresponds to an image pickup plane of an image pickup element (photo-electric conversion element), such as a CCD sensor or a CMOS sensor, in the case where a zoom lens is adopted as an imaging optical system of any of a digital camera, a video camera and a monitoring camera. The image plane IP corresponds to a film surface in the case where a zoom lens is adopted as an imaging optical system of a silver halide film camera. The diagrams illustrate an optical axis OA. In the following embodiments, a wide angle end and a telephoto end indicate zoom positions at the respective ends of a range in which a lens unit for varying magnification can mechanically move on the optical axis. In the lens sectional views, arrows indicate movement loci of the respective lens units during zooming from a wide angle end to a telephoto end.

Arrows pertaining to focusing indicate movement directions of lens units during focusing from infinity to a short distance. In spherical aberration diagrams, solid lines indicate d-lines (587.6 nm), and broken lines indicate g-lines (435.8 nm). In a diagram illustrating astigmatism, a solid line S indicates the sagittal direction of the d-line, and a broken line M indicates the meridional direction of the d-line. A diagram illustrating distortion illustrates distortion for the d-line. The diagram illustrates F-number Fno, and the half angle of view ω (degrees) for the imaging angle of view.

The zoom lens OL of each embodiment includes, in order from an object side to an image side: a first lens unit L1 having a negative refractive power; a second lens unit L2 having a positive refractive power; a middle lens group LM including at least one lens unit; and a final lens unit $L_{img}$ having a positive refractive power. The middle lens group LM includes a focus lens unit $L_f$ that has a negative refractive power and moves toward an image during focusing from infinity to a short distance. An aperture stop SP is arranged on an object side of the focus lens unit $L_f$. The intervals between adjacent lens units vary during at least one of zooming and focusing.

Here, a lens unit represents a subsystem separated by intervals that are along the optical axis and vary during at least one of zooming and focusing.

In the zoom lens of the present invention, the focus lens unit $L_f$ is arranged near the final lens unit $L_{img}$ through which a light beam passes at a low height, thereby achieving reduction in size of the focus lens unit $L_f$ and facilitating high speed focusing. Furthermore, in addition to reduction in the amount of focus driving and appropriate arrangement of refractive powers, variation in image magnification (imaging magnification) during focusing is suppressed. It is defined that the focal length $f_{img}$ is of the final lens unit $L_{img}$, the focal length $f_f$ is of the focus lens unit $L_f$, and the focal length $f_w$ is of the entire system at the wide angle end. In this case, the following conditional expressions are satisfied.

$$3.5 < f_{img}/f_w < 10.0 \quad (1)$$

$$-5.0 < f_f/f_w < -1.0 \quad (2)$$

Next, the technical meaning of the conditional expressions (1) and (2) are described. The conditional expression (1) represents normalization acquired by dividing the focal length of the final lens unit $L_{img}$ arranged nearest to the image by the focal length of the entire system at the wide angle end. If the lower limit of the conditional expression (1) is fallen short, the focal length of the final lens unit $L_{img}$ is short, that is, the positive refractive power is strong. In this case, a back focus of a prescribed length is easily secured in the entire zoom lens. However, the refractive power of the lens unit on an object side having the negative refractive power is required to be strengthened accordingly.

This case tends to represent the characteristics of a retrofocus type optical arrangement. Various aberrations including spherical aberration, coma, field curvature, and distortion increase. In particular, field curvature increases and is difficult to be corrected. Increase in back focus unfavorably increases the lens total length of the zoom lens accordingly.

In contrast, if the upper limit of the conditional expression (1) is exceeded, the focal length of the final lens unit $L_{img}$ is long, that is, the positive refractive power is low. Accordingly, the back focus is too short, which makes it difficult to arrange an image pickup element and a filter on the image side. Furthermore, as the back focus becomes short, the light beam incident angle on the image plane increases. When the light beam incident angle on the image plane is large, a light flux, which is to reach peripheral portions of the imaging range, is less likely to reach the light receiving element due to an effect from a microlens array arranged immediately before each light receiving element provided on the image plane. Accordingly, much shading occurs.

The conditional expression (2) represents normalization acquired by dividing the focal length $f_f$ of the focus lens unit $L_f$ by the focal length of the entire system at the wide angle end. If the lower limit of the conditional expression (2) is fallen short, the absolute value of the focal length of the focus lens unit $L_f$ is large, and the negative refractive power is low. In this case, focus sensitivity of the focus lens unit $L_f$ is low, and the amount of movement during focusing is large. Accordingly, high speed focusing is difficult. Furthermore, a space accommodating the amount of movement of the focus lens unit $L_f$ is required to be secured in the zoom lens. This requirement increases the size of the entire system.

In contrast, if the upper limit of the conditional expression (2) is exceeded, the absolute value of the focal length of the focus lens unit $L_f$ is small, and the negative refractive power is too strong. In this case, variation in various aberrations associated with focusing increases, making it difficult to correct the various aberrations.

In each embodiment, the conditional expressions (1) and (2) are satisfied. Accordingly, the various aberrations are favorably corrected while the size of the entire system is kept small. Furthermore, the back focus is sufficiently secured, and the amount of driving (the amount of movement) of the focus lens unit is reduced. Accordingly, variation in aberrations during focusing is reduced. Furthermore, the numerical ranges of the conditional expressions (1) and (2) are favorably set as follows.

$$4.0 < f_{img}/f_w < 9.5 \tag{1a}$$

$$-4.5 < f_f/f_w < -2.5 \tag{2a}$$

Moreover, in the zoom lens of the present invention, at least one of the following conditional expressions is favorably satisfied. It is defined that a transverse magnification $\beta_f$ is of the focus lens unit $L_f$ at the wide angle end, a transverse magnification $\beta_{fimg}$ is of the subsystem from the focus lens unit $L_f$ to the final lens unit $L_{img}$ at the wide angle end, a back focus $BF_w$ is at the wide angle end, and an amount of movement $m_{img}$ is of the final lens unit $L_{img}$ during zooming from the wide angle end to the telephoto end.

Here, the amount of movement during zooming from the wide angle end and to the telephoto end is the difference between positions of the lens unit at the wide angle end on the optical axis and the lens unit at the telephoto end on the optical axis. The sign of the amount of movement is positive when the lens unit is disposed nearer to the image at the telephoto end than at the wide angle end; the sign is negative when the lens unit is disposed nearer to the object at the telephoto end than at the wide angle end. Here, at least one of the following conditional expressions is favorably satisfied.

$$1.2 < |f_{img}/f_f| < 3.5 \tag{3}$$

$$1.3 < |(1-\beta_f^2) \times \beta_{fimg}^2| < 4.5 \tag{4}$$

$$2.0 < BF_w/f_w < 4.5 \tag{5}$$

$$0.5 < m_{img}/f_w < 3.0 \tag{6}$$

Next, the technical meaning of each of the foregoing conditional expressions is described.

The conditional expression (3) pertains to the ratio between the focal length of the final lens unit $L_{img}$ disposed nearest to the image and the focal length of the focus lens unit $L_f$. If the lower limit of the conditional expression (3) is fallen short, that is, the focal length of the final lens unit $L_{img}$ is relatively smaller than the absolute value of the focal length of the focus lens unit $L_f$, the positive refractive power of the final lens unit $L_{img}$ is strong. This case tends to represent the characteristics of a retrofocus type optical arrangement with respect to the entire zoom lens. Much various aberrations occur. In particular, the field curvature increases, and becomes difficult to be corrected.

Moreover, the absolute value of the focal length of the focus lens unit $L_f$ is large. The negative refractive power of the focus lens unit $L_i$ is weak. The amount of driving during focusing is large. These characteristics are unfavorable. In contrast, if the focal length of the final lens unit $L_{img}$ is long, exceeding the upper limit of the conditional expression (3), and the positive refractive power is weak, it is difficult to secure a back focus of a prescribed length. Moreover, if the absolute value of the focal length of the focus lens unit $L_f$ is small and the negative refractive power is strong, variation in aberration during focusing is large.

The conditional expression (4) pertains to focus sensitivity. The focus sensitivity is the ratio of amounts of movement for focusing in the case where the focus lens unit $L_f$ moves in the optical axis direction by a unit amount. If the focus sensitivity is less than the lower limit of the conditional expression (4), the amount of movement of the focus lens unit $L_f$ during focusing is large, which makes high speed focusing difficult. In contrast, if the focus sensitivity is too high, exceeding the upper limit of the conditional expression (4), the amount of movement of the focus lens unit $L_f$ during focusing is small. Accordingly, drive control of the focus lens unit $L_f$ during focusing becomes difficult.

The conditional expression (5) represents normalization acquired by dividing the back focus $BF_w$ at the wide angle end by the focal length of the entire system at the wide angle end. If the lower limit of the conditional expression (5) is fallen short, the back focus is too short. Accordingly, arrangement of the image pickup element and the filter on the image side is difficult. The light beam incident angle on the image plane increases, and a light flux that is to reach the peripheral portions of the imaging range and actually reaches the light receiving element decreases, thereby causing much shading. In contrast, if the upper limit of the conditional expression (5) is exceeded, the back focus is long, increasing the size of the entire zoom lens.

The conditional expression (6) represents normalization acquired by dividing the amount of movement $m_{img}$ of the final lens unit $L_{img}$ during zooming from the wide angle end to the telephoto end by the focal length of the entire system at the wide angle end. If the lower limit of the conditional expression (6) is fallen short, the amount of movement of the final lens unit $L_{img}$ during zooming from the wide angle end to the telephoto end decreases. Accordingly, it is difficult to achieve a high zoom ratio. In contrast, the upper limit of the conditional expression (6) is exceeded, the amount of movement of the final lens unit $L_{img}$ during zooming from the wide angle end to the telephoto end is too large, increasing the size of the zoom lens. Furthermore, the numerical ranges of the conditional expressions (3) to (6) are favorably configured as follows.

$$1.3 < |f_{img}/f_f| < 3.0 \tag{3a}$$

$$1.5 < |(1-\beta_f^2) \times \beta_{fimg}^2| < 4.0 \tag{4a}$$

$$2.3 < BF_w/f_w < 4.0 \tag{5a}$$

$$0.7 < m_{img}/f_w < 2.5 \tag{6a}$$

In each embodiment, the focus lens unit $L_f$ favorably is made up of one lens. High speed focusing requires the weight of the focus lens unit $L_f$ to be light as much as possible. Thus, the focus lens unit $L_f$ favorably is made up of one lens.

Further, in each embodiment, the first lens unit L1 having a negative refractive power comprises a first lens having a negative refractive power and a plastic aspheric lens having a negative refractive power in order from an object side to an image side, and satisfies at least one of the following conditional expressions:

$$-9.0 < f_{asph}/f_w < -5.5 \tag{7}$$

$$0.0001 < d_{asph}/TL < 0.01 \tag{8}$$

where $f_{asph}$ represents the focal length of the plastic aspheric lens, $d_{asph}$ represents a distance between the first lens having a negative refractive power and the plastic aspheric lens having a negative refractive power along the optical axis, and TL represents a distance from a lens surface of the first lens at an object side (the first surface) to the image plane along the optical axis. The conditional expression (7) relates to a focal length of the plastic aspheric lens. If an absolute value of the focal length of the plastic aspheric lens increases to make the lower limit of the conditional expression (7) fallen short, a refractive power of the plastic aspheric lens decreases. Accordingly, it is difficult to correct a distortion and a field curvature. In contrast, if the absolute value of the focal length of the plastic aspheric lens decreases to make the upper limit of the conditional expression (7) exceeded, the refractive power of the plastic aspheric lens increases. Accordingly, it is not preferable since a variation of an optical performance of the zoom lens increases when a temperature varies.

The conditional expression (8) relates to the distance between the first lens having a negative refractive power and the plastic aspheric lens having a negative refractive power along the optical axis. If the distance between the first lens having a negative refractive power and the plastic aspheric lens having a negative refractive power along the optical axis decreases to make the lower limit of the conditional expression (8) fallen short, interference is likely to occur between the first lens and the plastic aspheric lens. Accordingly, it is not preferable since a scratch or the like is likely to be generated on the first lens and the plastic aspheric lens. In contrast, if the distance between the first lens having a negative refractive power and the plastic aspheric lens having a negative refractive power along the optical axis increases to make the upper limit of the conditional expression (8) exceeded, an incident height of an off-axial chief ray to the plastic aspheric lens decreases, an aspheric surface effect decreases. Accordingly, it is difficult to correct a distortion and a field curvature.

Furthermore, the numerical ranges of the conditional expressions (7) and (8) are favorably configured as follows.

$$-7.5 < f_{asph}/f_w < -6.0 \tag{7a}$$

$$0.0005 < d_{asph}/TL < 0.005 \tag{8a}$$

In each embodiment, the final lens unit $L_{img}$ favorably has at least one aspheric surface. Arrangement of the aspheric surface on the final lens unit $L_{img}$ facilitates correcting various aberrations that tend to occur in a retrofocus type optical arrangement, particularly field curvature. Next, the lens configurations of the zoom lenses in the respective embodiments are described.

Embodiment 1

Figure 1:
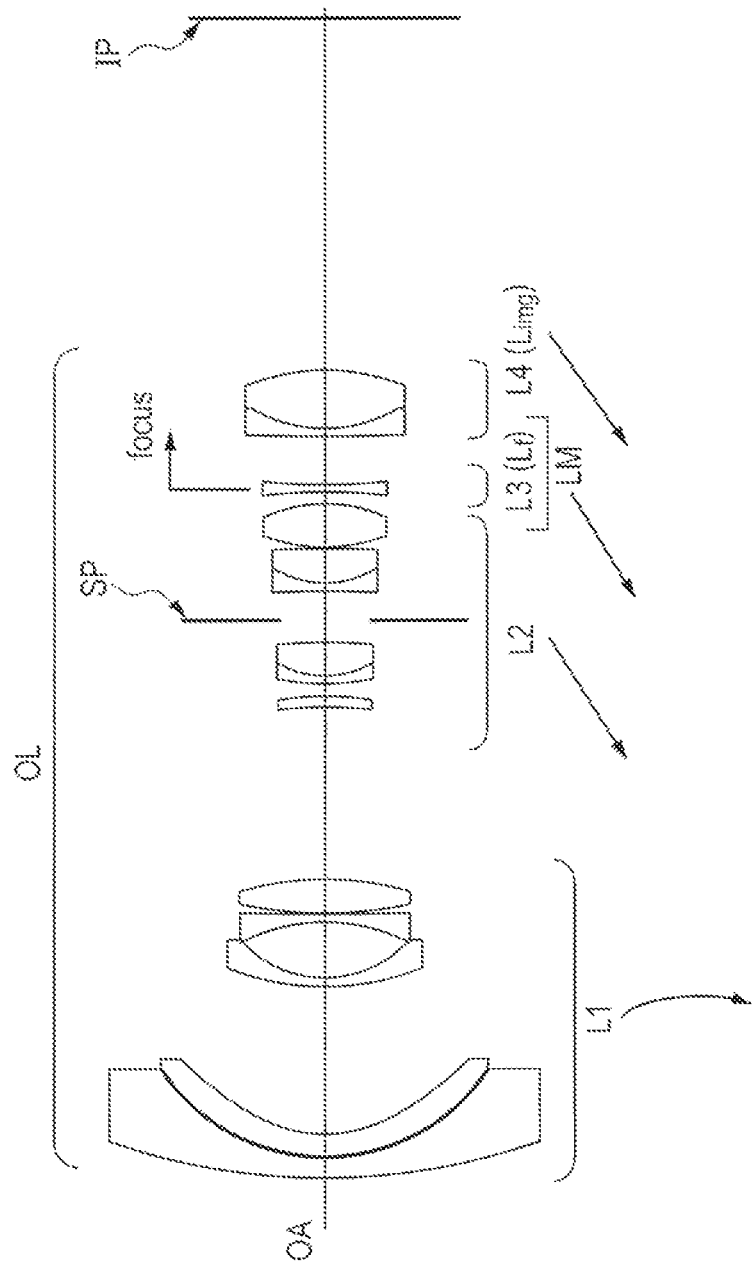
FIG. 1 is a lens sectional view of a zoom lens of Embodiment 1 at the wide angle end.

Hereinafter, referring to FIG. 1, a lens configuration of a zoom lens OL of Embodiment 1 of the present invention is described. The zoom lens OL of Embodiment 1 includes, in order from the object side to the image side: a first lens unit L1 having a negative refractive power; a second lens unit L2 having a positive refractive power; a third lens unit L3 having a negative refractive power; and a fourth lens unit L4 having a positive refractive power. The lens units move along respective loci different from each other as indicated by arrows during zooming. During zooming from the wide angle end to the telephoto end, the first lens unit L1 moves along a locus convex toward the image. The second lens unit L2, the third lens unit L3 and the fourth lens unit L4 move toward the object.

Embodiment 1 is a zoom lens with a wide angle of view where the zoom ratio is 1.70 and the imaging angle of view (2ω) ranges from 105.84° to 75.96°. In Embodiment 1, the fourth lens unit L4 is a final lens unit ($L_{img}$). The third lens unit L3 is a focus lens unit ($L_f$) that moves along the optical axis toward the image during focusing from infinity to a short distance.

Figure 2A:
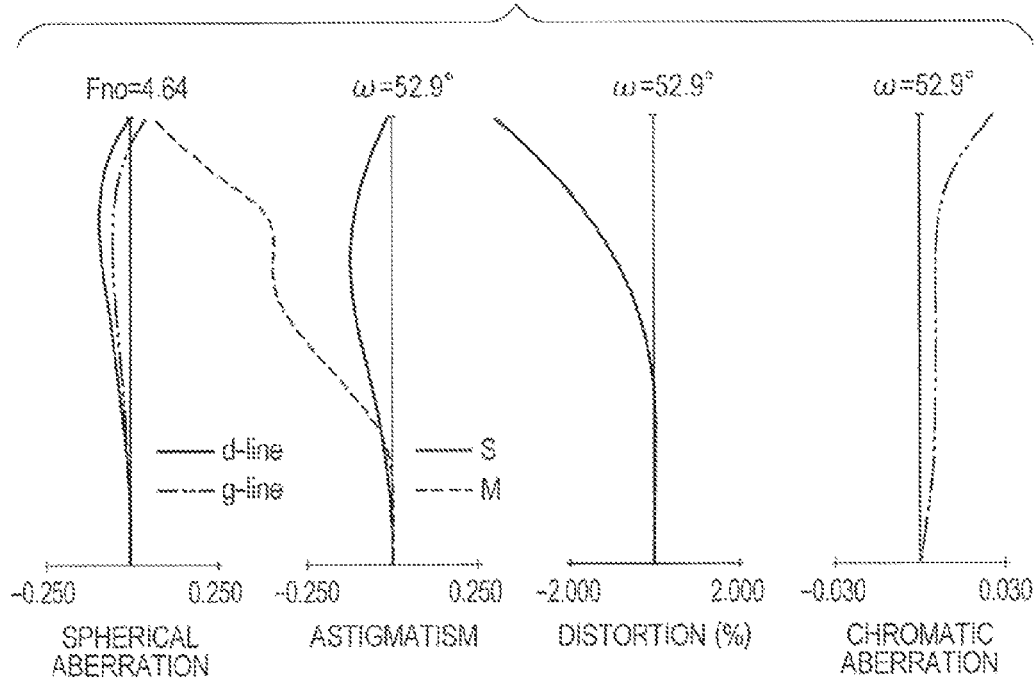
FIG. 2A is a longitudinal aberration diagram of the zoom lens of Embodiment 1 at the wide angle end.
Figure 2B:
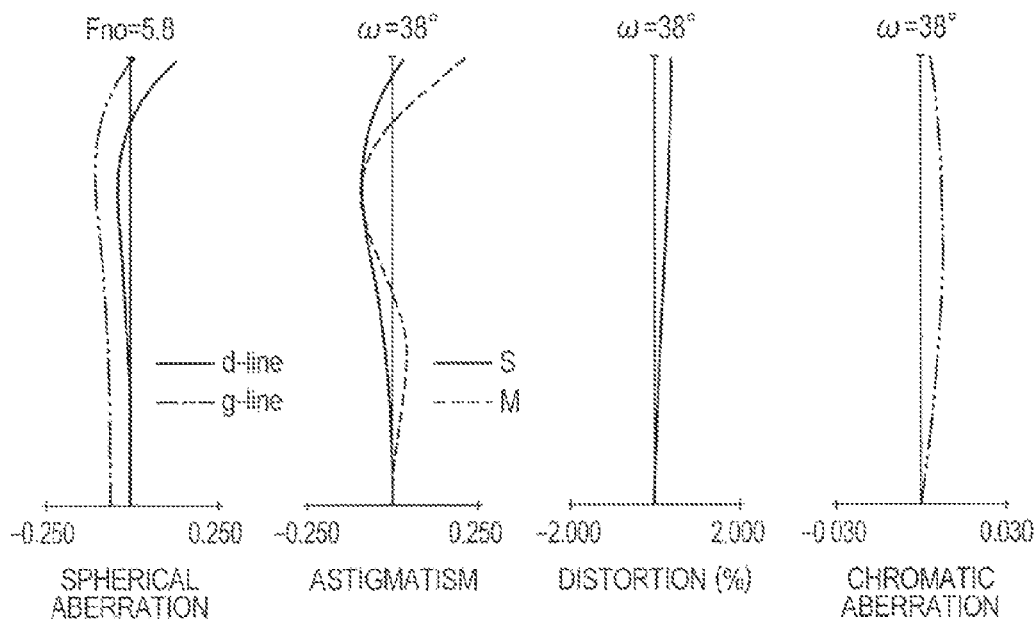
FIG. 2B is a longitudinal aberration diagram of the zoom lens of Embodiment 1 at the telephoto end.

As illustrated in FIGS. 2A and 2B, in the zoom lens of this embodiment, various aberrations including spherical aberration, coma, field curvature, and distortion are favorably corrected. Furthermore, the position in the optical axis direction and appropriate refractive power arrangement of the third lens unit L3 suppress variation in image magnification during focusing. As a result, the variation in image magnification during focusing is small, and the third lens unit L3 is small and lightweight, thereby facilitating high speed focusing.

Embodiment 2

Hereinafter, referring to FIG. 3, a lens configuration of a zoom lens OL of Embodiment 2 of the present invention is described. The refractive power arrangement of the lens units in the zoom lens OL in Embodiment 2 is identical to the arrangement in Embodiment 1. During zooming from the wide angle end to the telephoto end, the first lens unit L1 moves along a locus convex toward the image. The second lens unit L2, the third lens unit L3 and the fourth lens unit L4 move along the same locus toward the object. Embodiment 2 is a zoom lens with a wide angle of view where the zoom ratio is 1.54 and the imaging angle of view ranges from 100.68° to 75.96°.

Figure 4A:
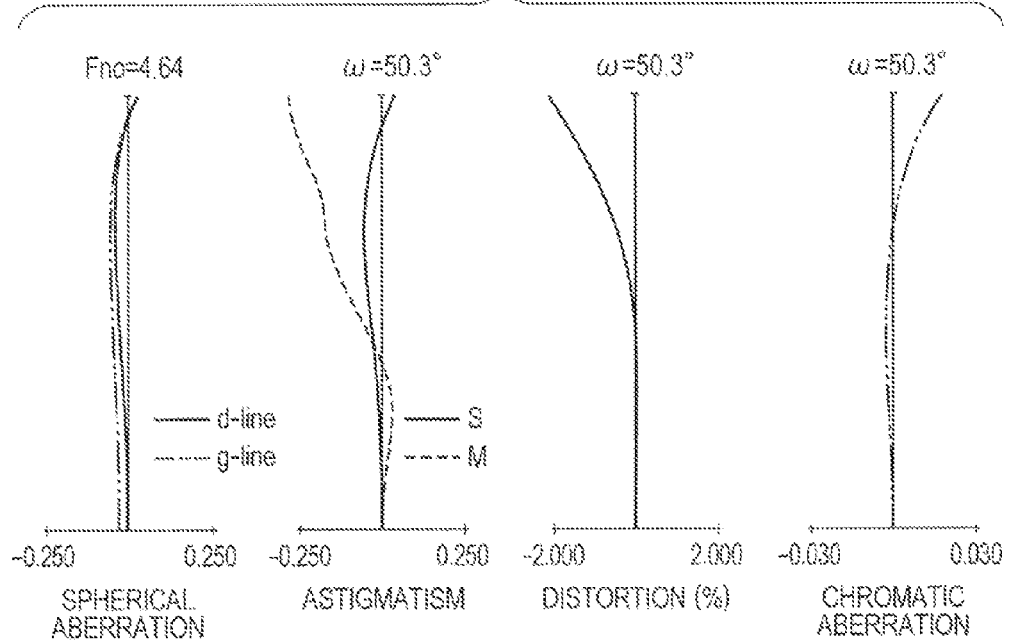
FIG. 4A is a longitudinal aberration diagram of the zoom lens of Embodiment 2 at the wide angle end.
Figure 4B:
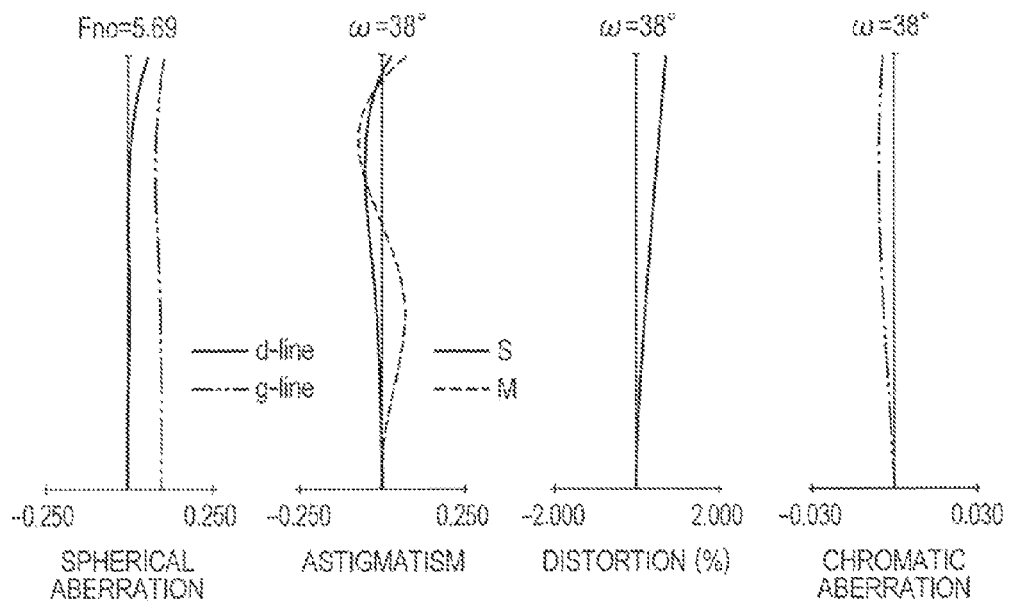
FIG. 4B is a longitudinal aberration diagram of the zoom lens of Embodiment 2 at the telephoto end.

As illustrated in FIGS. 4A and 4B, in the zoom lens of this embodiment, various aberrations including spherical aberration, coma, field curvature, and distortion are favorably corrected. Furthermore, the position in the optical axis direction and appropriate refractive power arrangement of the third lens unit L3 suppress variation in image magnification during focusing. As a result, the variation in image magnification during focusing is small, and the third lens unit L3 is small and lightweight, thereby facilitating high speed focusing.

Embodiment 3

Hereinafter, referring to FIG. 5, a lens configuration of a zoom lens OL of Embodiment 3 of the present invention is described. The zoom lens OL of Embodiment 3 includes, in order from the object side to the image side: a first lens unit L1 having a negative refractive power; a second lens unit L2 having a positive refractive power; a third lens unit L3 having a positive refractive power; a fourth lens unit L4 having a negative refractive power; and a fifth lens unit L5 having a positive refractive power. During zooming from the wide angle end to the telephoto end, the first lens unit L1 moves along a locus convex toward the image. The second lens unit L2 to the fifth lens unit L5 move toward the object along respective loci different from each other.

In various pieces of data of after-mentioned Numerical Example 3, the interval d15 between the second lens unit L2 and the third lens unit L3 is represented to have the same value of 3.21 at the wide angle end, an intermediate position, and the telephoto end. This representation is caused by rounding off from the second decimal place. Actual values are 3.2083 at the wide angle end, 3.2082 at the intermediate position, and 3.2081 at the telephoto end. The interval d15 between the second lens unit L2 and the third lens unit L3 varies during zooming even though the variation is slight.

Embodiment 3 is a zoom lens with a wide angle of view where the zoom ratio is 2.24 and the imaging angle of view ranges from 110.24° to 65.2°. In Embodiment 3, the fifth lens unit L5 is a final lens unit ($L_{img}$). The fourth lens unit L4 is a focus lens unit ($L_f$) that moves along the optical axis toward the image during focusing from infinity to a short distance.

Figure 6A:
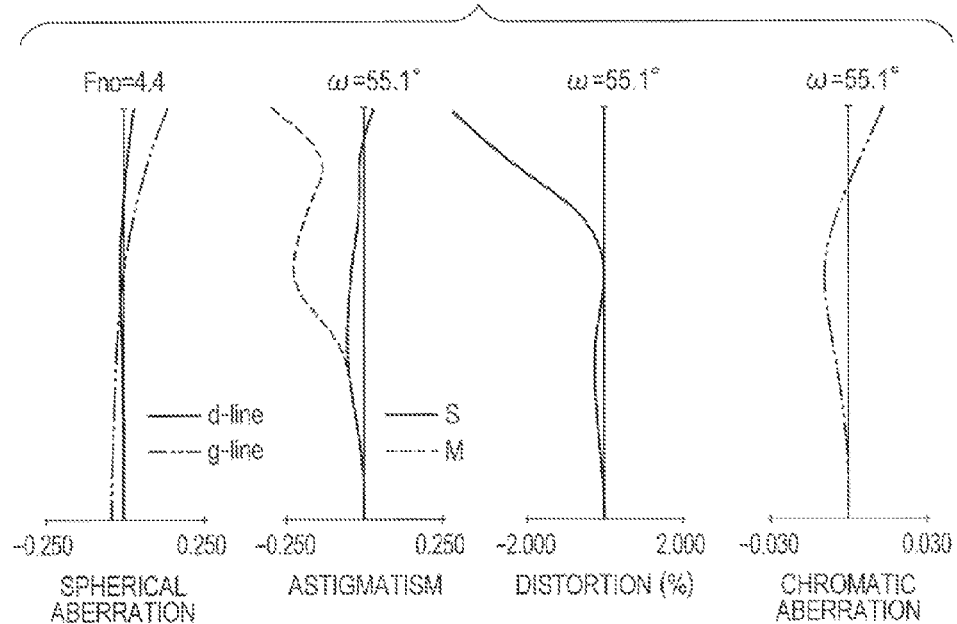
FIG. 6A is a longitudinal aberration diagram of the zoom lens of Embodiment 3 at the wide angle end.
Figure 6B:
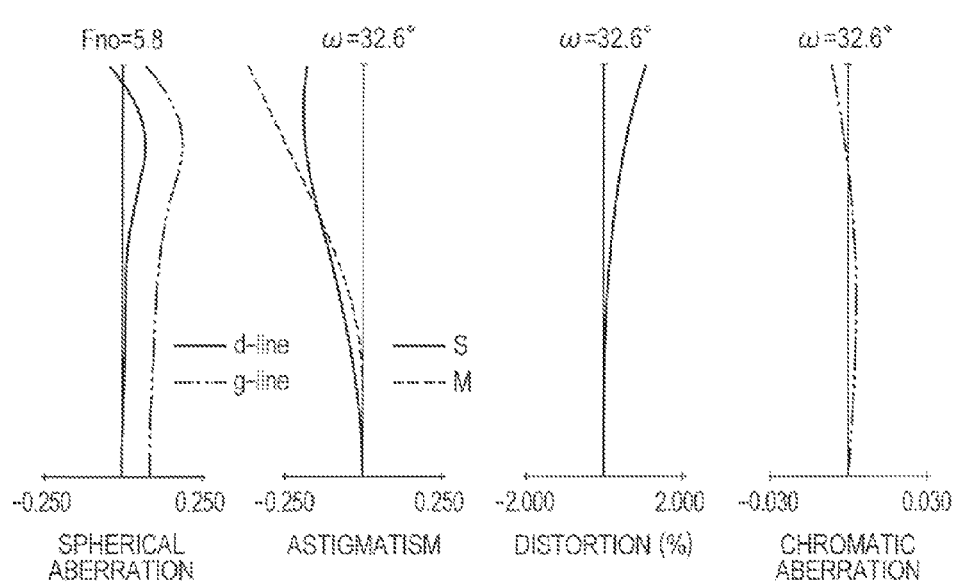
FIG. 6B is a longitudinal aberration diagram of the zoom lens of Embodiment 3 at the telephoto end.

As illustrated in FIGS. 6A and 6B, in the zoom lens of this embodiment, various aberrations including spherical aberration, coma, field curvature, and distortion are favorably corrected. Furthermore, the position in the optical axis direction and appropriate refractive power arrangement of the fourth lens unit L4 suppress variation in image magnification during focusing. As a result, the variation in image magnification during focusing is small. The fourth lens unit L4 is small and lightweight, thereby facilitating high speed focusing.

Embodiment 4

Hereinafter, referring to FIG. 7, a lens configuration of a zoom lens OL of Embodiment 4 of the present invention is described. The zoom lens OL of Embodiment 4 includes, in order from the object side to the image side: a first lens unit L1 having a negative refractive power; a second lens unit L2 having a positive refractive power; a third lens unit L3 having a negative refractive power; a fourth lens unit L4 having a negative refractive power; and a fifth lens unit L5 having a positive refractive power. During zooming from the wide angle end to the telephoto end, the first lens unit L1 moves along a locus convex toward the image. The second lens unit L2 to the fifth lens unit L5 move toward the object along respective loci different from each other. Embodiment 4 is a zoom lens with a wide angle of view where the zoom ratio is 1.44 and the imaging angle of view ranges from 94.22° to 73.52°.

In Embodiment 4, the fifth lens unit L5 is a final lens unit ($L_{img}$). The third lens unit L3 is a focus lens unit ($L_f$) that moves along the optical axis toward the image during focusing from infinity to a short distance.

Figure 8A:
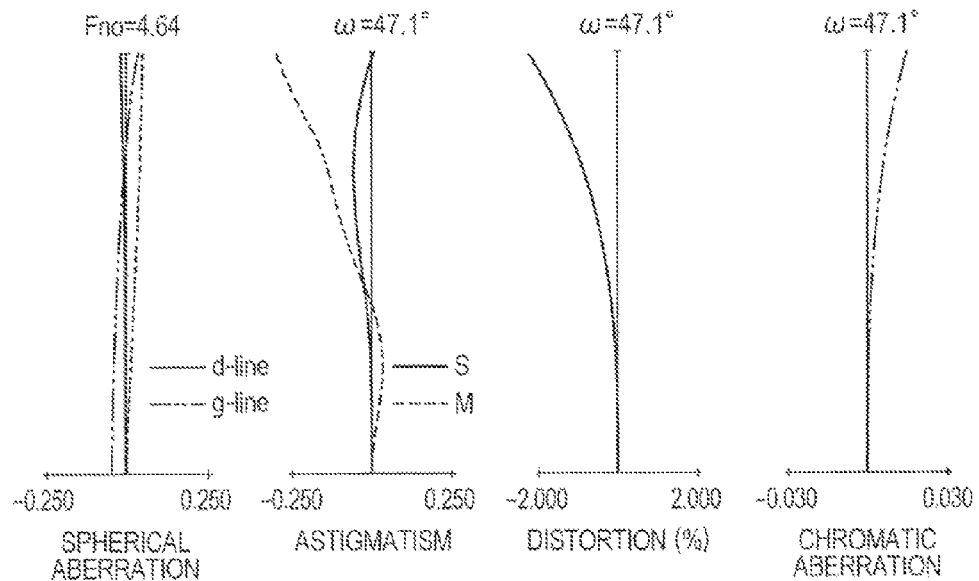
FIG. 8A is a longitudinal aberration diagram of the zoom lens of Embodiment 4 at the wide angle end.
Figure 8B:
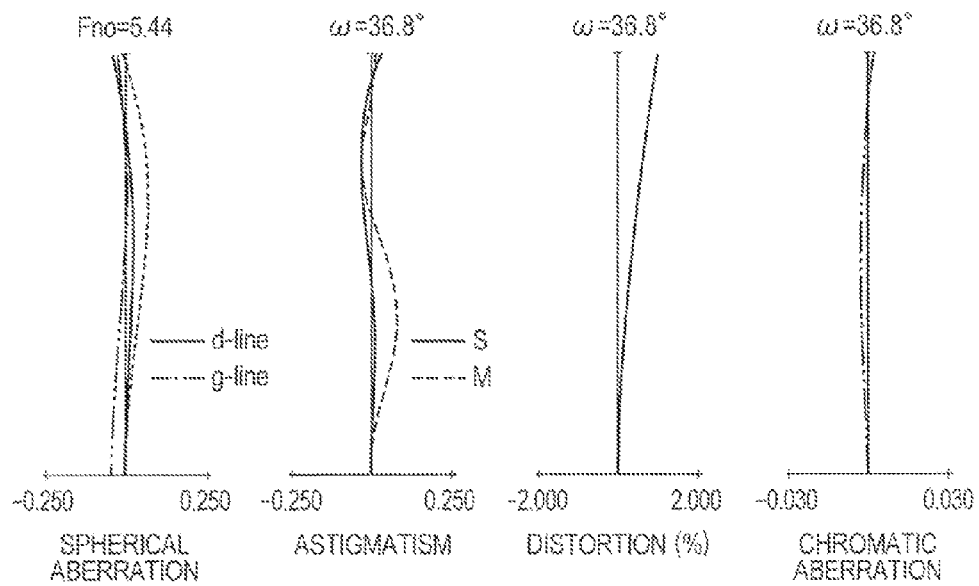
FIG. 8B is a longitudinal aberration diagram of the zoom lens of Embodiment 4 at the telephoto end.

As illustrated in FIGS. 8A and 8B, in the zoom lens of this embodiment, various aberrations including spherical aberration, coma, field curvature, and distortion are favorably corrected. Furthermore, the position in the optical axis direction and appropriate refractive power arrangement of the third lens unit L3 suppress variation in image magnification during focusing. As a result, the variation in image magnification during focusing is small, and the third lens unit L3 is small and lightweight, thereby facilitating high speed focusing.

FIG. 9 is a schematic diagram of principal parts of a single-lens reflex camera. In FIG. 9, an imaging optical system 10 includes a zoom lens 1 of any of Embodiments 1 to 4. The imaging optical system 1 is held by a lens barrel 2, which serves as a holding member. The diagram also illustrates a camera body 20. The camera body 20 includes a quick return mirror 3, a focusing glass 4, a pentagonal Dach prism 5 and an eyepiece 6. The quick return mirror 3 reflects a light flux from the imaging optical system 10 upward. The focusing glass 4 is arranged on an image formation position of the imaging optical system 10. The pentagonal Dach prism 5 converts a reverse image formed on the focusing glass 4 into an erect image. An observer observes the erect image through the eyepiece 6.

On a photosensitive surface 7, a solid image pickup element (photo-electric conversion element), such as a CCD sensor or a CMOS sensor, which receives light of an image, or a silver halide film is arranged. During imaging, the quick return mirror 3 is retracted from the optical path, and an image is formed on the photosensitive surface 7 by the imaging optical system 10.

Thus, the zoom lens of the present invention is applied to an image pickup device, such as an interchangeable lens for a single-lens reflex camera, thereby achieving an image pickup device having a high optical performance. Furthermore, the zoom lens of the present invention is applicable to a single-lens reflex camera having a mirror lens with no quick return mirror in an analogous manner. The zoom lens of the present invention is applicable not only to a digital camera, a video camera and a silver halide film camera but also to optical devices, such as a telescope, a binocular, a copier and a projector. The favorable embodiments of the present invention have been described above. However, the present invention is not limited to these embodiments. Instead, various modifications and changes can be made within the scope of the gist thereof.

Specific numerical data of zoom lenses of Numerical Examples 1 to 4 are hereinafter described. The order i is counted from the object. The surface number i is sequentially counted from the object side. The curvature radius ri (mm) and the interval di (mm) are between the i-th surface and the (i+1)-th surface. A refractive index ndi and an Abbe number νdi are between the i-th surface and the (i+1)-th surface for d-line. A back focus BF is also represented. The lens total length is a distance from the first lens surface to the image plane.

An aspheric surface is represented by adding a symbol * after the surface number. It is defined that x denotes a displacement from a surface apex in the optical axis direction, h denotes a height from the optical axis in a direction perpendicular to the optical axis, r denotes a paraxial curvature radius, K denotes a conic constant, and B, C, D, E and F . . . denote aspheric surface coefficients of respective degrees; an aspheric surface shape is represented as follows.

$$x=(h^2/R)/[1+\{1-(1+k)(h/R)^2\}^{1/2}+B\cdot h^4+C\cdot h^6+D\cdot h^8+E\cdot h^{10}+F\cdot h^{12}\ldots$$

Note that "e±XX" of each aspheric surface coefficient means "×10$^{\pm XX}$". Table 1 illustrates numeric values corresponding to the conditional expressions described above.

Numerical Example 1

| Unit mm | | | | | |
| --- | --- | --- | --- | --- | --- |
| Surface Data | | | | | |
| Surface number | r | d | nd | νd | Effective diameter |
| 1 | 65.393 | 2.00 | 1.77250 | 49.6 | 41.98 |
| 2 | 19.774 | 0.21 | | | 31.81 |
| 3 | 19.623 | 2.20 | 1.52996 | 55.8 | 31.64 |
| 4* | 12.890 | 14.82 | | | 29.14 |
| 5 | 26.261 | 0.90 | 1.77250 | 49.6 | 18.33 |
| 6 | 11.536 | 5.58 | | | 15.90 |
| 7 | −18.464 | 0.80 | 1.59522 | 67.7 | 15.61 |
| 8 | 344.979 | 0.10 | | | 15.85 |
| 9 | 41.566 | 3.39 | 1.72047 | 34.7 | 15.99 |
| 10 | −30.947 | (Variable) | | | 15.90 |
| 11 | −46.472 | 1.11 | 1.48749 | 70.2 | 8.55 |
| 12 | −29.312 | 1.23 | | | 8.73 |
| 13 | 23.761 | 0.80 | 1.91082 | 35.3 | 8.95 |
| 14 | 9.192 | 3.37 | 1.60342 | 38.0 | 8.77 |
| 15 | −53.118 | 2.19 | | | 8.89 |
| 16(Stop) | ∞ | 2.96 | | | 8.88 |
| 17 | −115.956 | 0.80 | 1.83481 | 42.7 | 8.96 |
| 18 | 9.582 | 3.45 | 1.64769 | 33.8 | 9.10 |
| 19 | −187.956 | 0.15 | | | 9.76 |
| 20 | 16.818 | 4.37 | 1.49700 | 81.5 | 10.68 |
| 21 | −14.618 | (Variable) | | | 11.33 |
| 22 | −51.594 | 0.70 | 1.91082 | 35.3 | 11.34 |
| 23 | 59.318 | (Variable) | | | 11.48 |
| 24 | 192.633 | 0.80 | 1.91082 | 35.3 | 13.31 |

-continued

Unit mm

| | | | | | |
|---|---|---|---|---|---|
| 25 | 14.245 | 5.88 | 1.58313 | 59.4 | 13.73 |
| 26* | −19.863 | (Variable) | | | 15.00 |
| Image plane | ∞ | | | | |

Aspheric surface data

Fourth Surface

K = −4.75949e−001 B = −3.82851e−005 C = −7.50548e−008
D = −2.94600e−010 E = 1.45343e−012 F = −5.04519e−015

Twenty Sixth Surface

K = 0.00000e+000 B = 2.17541e−005 C = −2.27082e−007
D = 1.49496e−008 E = −2.85254e−010 F = 2.16561e−012

Various Pieces of Data
Zoom Ratio 1.70

| | Wide-angle | Intermediate | Telephoto |
|---|---|---|---|
| Focal length | 10.30 | 13.78 | 17.46 |
| F-number | 4.64 | 5.18 | 5.80 |
| Half angle of view (degree) | 52.92 | 44.69 | 37.98 |
| Image height | 13.63 | 13.63 | 13.63 |
| Total lens length | 116.58 | 113.53 | 114.08 |
| BF | 35.35 | 42.10 | 48.84 |
| d10 | 17.35 | 7.56 | 1.37 |
| d21 | 1.20 | 1.57 | 2.05 |
| d23 | 4.85 | 4.48 | 4.00 |
| d26 | 35.35 | 42.10 | 48.84 |
| Entrance pupil position | 16.70 | 16.08 | 15.54 |
| Exit pupil position | −29.55 | −29.11 | −28.54 |
| Front principal point position | 25.36 | 27.19 | 29.07 |
| Rear principal point position | 25.05 | 28.32 | 31.38 |

Zoom Lens Unit Data

| Unit | Start surface | Focal length | Lens configuration length | Front principal point position | Rear principal point position |
|---|---|---|---|---|---|
| 1 | 1 | −13.17 | 30.01 | 6.53 | −20.04 |
| 2 | 11 | 18.76 | 20.43 | 13.34 | −4.68 |
| 3 | 22 | −30.20 | 0.70 | 0.17 | −0.20 |
| 4 | 24 | 76.60 | 6.68 | 8.63 | 5.03 |

Single Lens Data

| Lens | Start surface | Focal length |
|---|---|---|
| 1 | 1 | −37.41 |
| 2 | 3 | −79.94 |
| 3 | 5 | −27.36 |
| 4 | 7 | −29.42 |
| 5 | 9 | 25.11 |
| 6 | 11 | 159.44 |
| 7 | 13 | −16.90 |
| 8 | 14 | 13.26 |
| 9 | 17 | −10.57 |
| 10 | 18 | 14.17 |
| 11 | 20 | 16.50 |
| 12 | 22 | −30.20 |
| 13 | 24 | −16.92 |
| 14 | 25 | 15.19 |

Numerical Example 2

Unit mm

Surface Data

| Surface number | r | d | nd | vd | Effective diameter |
|---|---|---|---|---|---|
| 1 | 67.024 | 2.00 | 1.51633 | 64.1 | 43.22 |
| 2 | 19.596 | 0.07 | | | 32.10 |
| 3 | 19.534 | 2.20 | 1.52996 | 55.8 | 32.02 |
| 4* | 12.851 | 15.00 | | | 28.71 |
| 5 | 36.072 | 0.90 | 1.83481 | 42.7 | 17.55 |
| 6 | 10.799 | 5.36 | | | 14.90 |
| 7 | −18.784 | 0.80 | 1.59522 | 67.7 | 14.63 |
| 8 | −77.361 | 0.15 | | | 14.89 |
| 9 | 30.490 | 3.06 | 1.72047 | 34.7 | 15.03 |
| 10 | −43.008 | (Variable) | | | 14.80 |
| 11 | −46.868 | 1.05 | 1.48749 | 70.2 | 8.17 |
| 12 | −28.621 | 1.55 | | | 8.33 |
| 13 | 22.743 | 0.80 | 1.83481 | 42.7 | 8.58 |
| 14 | 9.162 | 3.16 | 1.54814 | 45.8 | 8.42 |
| 15 | −29.837 | 2.05 | | | 8.52 |
| 16(Stop) | ∞ | 3.38 | | | 8.34 |
| 17 | −16.362 | 0.80 | 1.91082 | 35.3 | 8.13 |
| 18 | 15.294 | 2.91 | 1.72151 | 29.2 | 8.63 |
| 19 | −21.362 | 0.19 | | | 9.80 |
| 20 | 22.594 | 3.25 | 1.49700 | 81.5 | 11.00 |
| 21 | −15.930 | 1.30 | | | 11.50 |
| 22 | 84.915 | 0.80 | 1.91082 | 35.3 | 11.82 |
| 23 | 29.661 | 3.57 | | | 11.82 |
| 24 | 146.421 | 0.90 | 1.91082 | 35.3 | 13.01 |
| 25 | 12.713 | 6.08 | 1.58313 | 59.4 | 13.41 |
| 26* | −21.551 | (Variable) | | | 14.80 |
| Image plane | ∞ | | | | |

Aspheric surface data

Fourth Surface

K = −4.75949e−001 B = −2.14159e−005 C = −6.60610e−008
D = −2.73069e−010 E = 1.03120e−012 F = −4.58549e−015

Twenty Sixth Surface

K = 0.00000e+000 B = 6.77849e−006 C = −2.38100e−007
D = 6.64682e−009 E = −1.14977e−010 F = 6.72515e−013

Various Pieces of Data
Zoom Ratio 1.54

| | Wide-angle | Intermediate | Telephoto |
|---|---|---|---|
| Focal length | 11.30 | 15.06 | 17.46 |
| F-number | 4.64 | 5.28 | 5.69 |
| Half angle of view (degree) | 50.34 | 42.15 | 37.98 |
| Image height | 13.63 | 13.63 | 13.63 |
| Total lens length | 110.71 | 108.93 | 109.83 |
| BF | 35.00 | 42.24 | 46.86 |
| d10 | 14.37 | 5.35 | 1.62 |
| d26 | 35.00 | 42.24 | 46.86 |
| Entrance pupil position | 18.33 | 17.60 | 17.21 |
| Exit pupil position | −26.53 | −26.53 | −26.53 |
| Front principal point position | 27.55 | 29.36 | 30.52 |
| Rear principal point position | 23.70 | 27.18 | 29.41 |

Zoom Lens Unit Data

| Unit | Start surface | Focal length | Lens configuration length | Front principal point position | Rear principal point position |
|---|---|---|---|---|---|
| 1 | 1 | −14.56 | 29.54 | 7.56 | −19.70 |
| 2 | 11 | 21.10 | 19.15 | 13.10 | −4.60 |
| 3 | 22 | −50.40 | 0.80 | 0.65 | 0.23 |
| 4 | 24 | 105.00 | 6.98 | 11.11 | 7.55 |

-continued

| Unit mm | | |
|---|---|---|
| Single Lens Data | | |
| Lens | Start surface | Focal length |
| 1 | 1 | −54.42 |
| 2 | 3 | −80.01 |
| 3 | 5 | −18.77 |
| 4 | 7 | −41.89 |
| 5 | 9 | 25.20 |
| 6 | 11 | 148.02 |
| 7 | 13 | −18.89 |
| 8 | 14 | 13.17 |
| 9 | 17 | −8.58 |
| 10 | 18 | 12.78 |
| 11 | 20 | 19.34 |
| 12 | 22 | −50.40 |
| 13 | 24 | −15.33 |
| 14 | 25 | 14.67 |

Numerical Example 3

Unit mm

Surface Data

| Surface number | r | d | nd | vd | Effective diameter |
|---|---|---|---|---|---|
| 1* | 62.304 | 1.70 | 1.80400 | 46.6 | 45.07 |
| 2 | 19.433 | 0.20 | | | 33.92 |
| 3 | 19.433 | 2.30 | 1.52996 | 55.8 | 33.80 |
| 4* | 12.025 | 11.34 | | | 28.20 |
| 5 | 25.935 | 0.90 | 1.77250 | 49.6 | 23.19 |
| 6 | 12.880 | 8.02 | | | 19.82 |
| 7 | −19.426 | 0.80 | 1.59522 | 67.7 | 19.44 |
| 8 | −85.193 | 0.15 | | | 19.86 |
| 9 | 56.600 | 3.28 | 1.72047 | 34.7 | 20.01 |
| 10 | −49.434 | (Variable) | | | 19.87 |
| 11 | −211.721 | 1.73 | 1.48749 | 70.2 | 9.88 |
| 12 | −29.805 | 1.07 | | | 10.15 |
| 13 | 22.774 | 0.70 | 1.91082 | 35.3 | 10.44 |
| 14 | 9.661 | 3.64 | 1.58144 | 40.8 | 10.20 |
| 15 | −58.601 | (Variable) | | | 10.34 |
| 16(Stop) | ∞ | 3.19 | | | 10.38 |
| 17 | −27.572 | 0.70 | 1.83481 | 42.7 | 10.40 |
| 18 | 11.105 | 3.57 | 1.71736 | 29.5 | 10.87 |
| 19 | −31.515 | 0.15 | | | 11.32 |
| 20 | 21.783 | 3.76 | 1.49700 | 81.5 | 11.63 |
| 21 | −17.267 | (Variable) | | | 11.55 |
| 22 | −45.767 | 0.60 | 1.91082 | 35.3 | 10.46 |
| 23 | 49.785 | (Variable) | | | 10.32 |
| 24 | 105.075 | 0.70 | 1.91082 | 35.3 | 10.31 |
| 25 | 12.506 | 5.05 | 1.49710 | 81.6 | 10.67 |
| 26* | −14.235 | (Variable) | | | 12.13 |
| Image plane | ∞ | | | | |

Aspheric surface data

First surface

K = −3.81397e+000 B = 1.78033e−005 C = −6.05780e−009
D = −5.40009e−011 E = 8.31988e−014 F = −1.64860e−017

Fourth Surface

K = −3.72017e−001 B = −1.05015e−005 C = 3.69314e−008
D = 1.44990e−009 E = −1.71363e−011 F = 2.40573e−014

Twenty sixth surface

K = 0.00000e+000 B = −1.23310e−005 C = −4.96373e−007
D = 1.19352e−008 E = −5.80436e−010 F = 5.32465e−012

-continued

| Unit mm | | | |
|---|---|---|---|
| Various Pieces of Data Zoom Ratio 2.24 | | | |
| | Wide-angle | Intermediate | Telephoto |
| Focal length | 9.50 | 15.20 | 21.31 |
| F-number | 4.40 | 5.08 | 5.80 |
| Half angle of view (degree) | 55.12 | 41.88 | 32.60 |
| Image height | 13.63 | 13.63 | 13.63 |
| Total lens length | 123.37 | 117.73 | 120.93 |
| BF | 37.30 | 48.94 | 60.58 |
| d10 | 26.64 | 9.54 | 1.29 |
| d15 | 3.21 | 3.21 | 3.21 |
| d21 | 0.50 | 1.07 | 1.74 |
| d23 | 2.20 | 1.43 | 0.58 |
| d26 | 37.30 | 48.94 | 60.58 |
| Entrance pupil position | 16.04 | 15.23 | 14.60 |
| Exit pupil position | −22.20 | −21.22 | −20.15 |
| Front principal point position | 24.03 | 27.13 | 30.29 |
| Rear principal point position | 27.80 | 33.74 | 39.27 |

Zoom Lens Unit Data

| Unit | Start surface | Focal length | Lens configuration length | Front principal point position | Rear principal point position |
|---|---|---|---|---|---|
| 1 | 1 | −13.24 | 28.68 | 5.32 | −20.37 |
| 2 | 11 | 33.64 | 7.13 | 2.30 | −2.67 |
| 3 | 16 | 24.97 | 11.37 | 9.46 | 1.91 |
| 4 | 22 | −26.10 | 0.60 | 0.15 | −0.16 |
| 5 | 24 | 74.82 | 5.75 | 8.97 | 5.89 |

Single Lens Data

| Lens | Start surface | Focal length |
|---|---|---|
| 1 | 1 | −35.76 |
| 2 | 3 | −66.69 |
| 3 | 5 | −34.15 |
| 4 | 7 | −42.47 |
| 5 | 9 | 37.11 |
| 6 | 11 | 70.94 |
| 7 | 13 | −18.90 |
| 8 | 14 | 14.55 |
| 9 | 17 | −9.41 |
| 10 | 18 | 11.86 |
| 11 | 20 | 20.02 |
| 12 | 22 | −26.10 |
| 13 | 24 | −15.64 |
| 14 | 25 | 14.29 |

Numerical Example 4

Unit mm

Surface Data

| Surface number | r | d | nd | vd | Effective diameter |
|---|---|---|---|---|---|
| 1 | 41.995 | 2.00 | 1.48749 | 70.2 | 40.77 |
| 2 | 20.525 | 0.20 | | | 32.47 |
| 3 | 20.525 | 2.20 | 1.52996 | 55.8 | 32.32 |
| 4* | 13.319 | 15.44 | | | 27.96 |
| 5 | −431.645 | 0.90 | 1.80400 | 46.6 | 17.10 |
| 6 | 12.788 | 4.23 | | | 14.82 |
| 7 | −27.672 | 0.80 | 1.43875 | 94.9 | 14.69 |
| 8 | −50.804 | 0.15 | | | 14.76 |
| 9 | 25.460 | 3.01 | 1.80000 | 29.8 | 14.69 |
| 10 | −7092.378 | (Variable) | | | 14.14 |
| 11 | −58.261 | 1.43 | 1.48749 | 70.2 | 8.75 |
| 12 | −29.878 | 1.44 | | | 8.48 |

-continued

Unit mm

| 13 | 25.253 | 0.80 | 1.91082 | 35.3 | 8.27 |
| 14 | 10.706 | 3.96 | 1.59551 | 39.2 | 8.14 |
| 15 | −34.577 | 2.22 | | | 8.26 |
| 16(Stop) | ∞ | 2.13 | | | 8.07 |
| 17 | −24.628 | 0.80 | 1.83481 | 42.7 | 7.93 |
| 18 | 15.303 | 3.44 | 1.65844 | 50.9 | 8.75 |
| 19 | −25.557 | 0.19 | | | 10.11 |
| 20 | 27.141 | 4.62 | 1.49700 | 81.5 | 11.03 |
| 21 | −17.792 | (Variable) | | | 11.97 |
| 22 | −38.831 | 0.60 | 1.65160 | 58.5 | 12.15 |
| 23 | 79.759 | (Variable) | | | 12.41 |
| 24 | −121.211 | 1.20 | 1.52996 | 55.8 | 14.62 |
| 25* | 378.042 | (Variable) | | | 15.03 |
| 26 | 113.565 | 0.80 | 1.91082 | 35.3 | 15.38 |
| 27 | 23.771 | 4.30 | 1.55332 | 71.7 | 15.58 |
| 28* | −22.352 | (Variable) | | | 16.16 |
| Image plane | ∞ | | | | |

Aspheric surface data

Fourth Surface

K = −4.75949e−001 B = −6.29028e−006 C = −3.11309e−008
D = −1.05016e−010 E = 5.20437e−014 F = −3.03565e−015

Twenty Fifth Surface

K = −4.75949e−001 B = −3.82214e−005 C = −5.08157e−007
D = −7.83186e−009 E = 1.22990e−010 F = −7.47246e−013

Twenty Eighth Surface

K = 0.00000e+000 B = 5.68874e−005 C = 1.23900e−007
D = 1.40620e−008 E = −1.42260e−010 F = 7.39419e−013

Various Pieces of Data
Zoom Ratio 1.44

| | Wide-angle | Intermediate | Telephoto |
|---|---|---|---|
| Focal length | 12.66 | 16.37 | 18.24 |
| F-number | 4.64 | 5.16 | 5.44 |
| Half angle of view (degree) | 47.11 | 39.79 | 36.76 |
| Image height | 13.63 | 13.63 | 13.63 |
| Total lens length | 107.45 | 105.01 | 105.13 |
| BF | 30.88 | 36.91 | 40.32 |
| d10 | 12.55 | 4.68 | 1.96 |
| d21 | 1.00 | 1.46 | 1.51 |
| d23 | 5.56 | 4.55 | 3.94 |
| d25 | 0.60 | 0.57 | 0.53 |
| d28 | 30.88 | 36.91 | 40.32 |
| Entrance pupil position | 20.48 | 19.67 | 19.33 |
| Exit pupil position | −29.60 | −28.02 | −26.82 |
| Front principal point position | 30.49 | 31.92 | 32.61 |
| Rear principal point position | 18.22 | 20.54 | 22.08 |

Zoom Lens Unit Data

| Unit | Start surface | Focal length | Lens configuration length | Front principal point position | Rear principal point position |
|---|---|---|---|---|---|
| 1 | 1 | −15.52 | 28.93 | 9.55 | −16.25 |
| 2 | 11 | 19.75 | 21.03 | 12.87 | −5.63 |
| 3 | 22 | −40.00 | 0.60 | 0.12 | −0.24 |
| 4 | 24 | −173.04 | 1.20 | 0.19 | −0.59 |
| 5 | 26 | 55.00 | 5.10 | 4.02 | 0.88 |

Single Lens Data

| Lens | Start surface | Focal length |
|---|---|---|
| 1 | 1 | −84.95 |
| 2 | 3 | −80.05 |
| 3 | 5 | −15.43 |
| 4 | 7 | −140.00 |
| 5 | 9 | 31.72 |
| 6 | 11 | 123.76 |
| 7 | 13 | −20.95 |

-continued

Unit mm

| 8 | 14 | 14.19 |
| 9 | 17 | −11.20 |
| 10 | 18 | 15.04 |
| 11 | 20 | 22.39 |
| 12 | 22 | −40.00 |
| 13 | 24 | −173.04 |
| 14 | 26 | −33.15 |
| 15 | 27 | 21.54 |

TABLE 1

| Conditional Expression | Embodiment 1 | Embodiment 2 | Embodiment 3 | Embodiment 4 |
|---|---|---|---|---|
| (1) | 7.44 | 9.29 | 7.88 | 4.34 |
| (2) | −2.93 | −4.46 | −2.75 | −3.16 |
| (3) | 2.54 | 2.08 | 2.87 | 1.37 |
| (4) | 3.18 | 1.69 | 3.81 | 1.98 |
| (5) | 3.43 | 3.1 | 3.93 | 2.44 |
| (6) | 1.31 | 1.05 | 2.45 | 0.75 |
| (7) | −7.76 | −7.08 | −7.02 | −6.32 |
| (8) | 0.0018 | 0.0006 | 0.0016 | 0.0019 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-092174, filed Apr. 25, 2013, and Japanese Patent Application No. 2014-081262, filed Apr. 10, 2014, which are hereby incorporated by reference herein in their entirety.

What is claimed is:

1. A zoom lens, comprising, in order from an object side to an image side:
   a first lens unit having a negative refractive power;
   a second lens unit having a positive refractive power;
   a middle lens group including at least one lens unit; and
   a final lens unit having a positive refractive power,
   wherein the middle lens group comprises a focus lens unit that has a negative refractive power and moves toward the image side during focusing from infinity to a short distance, intervals between adjacent lens units vary during at least one of zooming and focusing, and
   wherein conditional expressions:

$$3.5 < f_{img}/f_w < 10.0,$$

$$-5.0 < f_f/f_w < -1.0, \text{ and}$$

$$2.0 < BF_w/f_w < 4.5$$

are satisfied where a focal length of the final lens unit is $f_{img}$, a focal length of the focus lens unit is $f_f$, a focal length of an entire system at a wide angle end is $f_w$, and a back focus at the wide angle end is $BF_w$.

2. The zoom lens according to claim 1, wherein a conditional expression $$1.2 < |f_{img}/f_f| < 3.5$$

is satisfied.

3. The zoom lens according to claim 1, wherein a conditional expression $$1.3 < |(1-\beta_f^2) \times \beta_{fimg}^2| < 4.5$$

is satisfied where a transverse magnification of the focus lens unit at the wide angle end is $\beta_f$, and a transverse magnification of a subsystem arranged between the focus lens unit and an image plane at the wide angle end is $\beta_{fimg}$.

4. The zoom lens according to claim 1, wherein a conditional expression $$0.5<m_{img}/f_w<3.0$$

is satisfied where an amount of movement of the final lens unit during zooming from the wide angle end to a telephoto end is $m_{img}$.

5. The zoom lens according to claim 1, wherein the focus lens unit is made up of one negative lens.

6. The zoom lens according to claim 1, wherein the final lens unit has at least one aspheric surface.

7. The zoom lens according to claim 1, wherein the zoom lens comprises, in order from the object side to the image side: a first lens unit having a negative refractive power; a second lens unit having a positive refractive power; a third lens unit having a negative refractive power; and a fourth lens unit having a positive refractive power, and wherein the focus lens unit is the third lens unit, and the final lens unit is the fourth lens unit.

8. The zoom lens according to claim 1, wherein the zoom lens comprises, in order from the object side to the image side:
    a first lens unit having a negative refractive power;
    a second lens unit having a positive refractive power;
    a third lens unit having a positive refractive power;
    a fourth lens unit having a negative refractive power; and
    a fifth lens unit having a positive refractive power, and
    wherein the focus lens unit is the fourth lens unit, and the final lens unit is the fifth lens unit.

9. The zoom lens according to claim 1, wherein the zoom lens comprises, in order from the object side to the image side:
    a first lens unit having a negative refractive power;
    a second lens unit having a positive refractive power;
    a third lens unit having a negative refractive power;
    a fourth lens unit having a negative refractive power; and
    a fifth lens unit having a positive refractive power, and
    wherein the focus lens unit is the third lens unit, and the final lens unit is the fifth lens unit.

10. The zoom lens according to claim 1, wherein the first lens unit comprises a first lens having a negative refractive power and a plastic aspheric lens having a negative refractive power in order from an object side to an image side, and wherein a conditional expression $$-9.0<f_{asph}/f_w<-5.5$$

is satisfied where a focal length of the plastic aspheric lens is $f_{asph}$.

11. The zoom lens according to claim 1, wherein the first lens unit comprises a first lens having a negative refractive power and a plastic aspheric lens having a negative refractive power in order from an object side to an image side, and wherein a conditional expression $$0.0001<d_{asph}/TL<0.01$$

is satisfied where a distance between the first lens having a negative refractive power and the plastic aspheric lens having a negative refractive power along the optical axis is $d_{asph}$ and a distance from a lens surface of the first lens at an object side to an image plane along the optical axis is TL.

12. An image pickup device comprising:
    a zoom lens; and
    an image pickup element that takes an optical image formed by the zoom lens,
    wherein the zoom lens comprises, in order from an object side to an image side:
        a first lens unit having a negative refractive power;
        a second lens unit having a positive refractive power;
        a middle lens group including at least one lens unit; and
        a final lens unit having a positive refractive power,
        wherein the middle lens group comprises a focus lens unit that has a negative refractive power and moves toward the image side during focusing from infinity to a short distance, intervals between adjacent lens units vary during at least one of zooming and focusing, and
        wherein conditional expressions $$3.5<f_{img}/f_w<10.0,$$

$$-5.0<f_f/f_w<-1.0, \text{ and}$$

$$2.0<BF_w/f_w<4.5$$

are satisfied where a focal length of the final lens unit is $f_{img}$, a focal length of the focus lens unit is $f_f$, and a focal length of an entire system at a wide angle end is $f_w$, and a back focus at the wide angle end is $BF_w$.

13. A zoom lens, comprising, in order from an object side to an image side:
    a first lens unit having a negative refractive power;
    a second lens unit having a positive refractive power;
    a third lens unit having a negative refractive power and moving toward the image side during focusing from infinity to a short distance; and
    a fourth lens unit having a positive refractive power,
    wherein intervals between adjacent lens units vary during at least one of zooming and focusing, and
    wherein conditional expressions $$3.5<f_{img}/f_w<10.0 \text{ and}$$

$$-5.0<f_f/f_w<-1.0$$

are satisfied where a focal length of the fourth lens unit is $f_{img}$, a focal length of the third lens unit is $f_f$, and a focal length of an entire system at a wide angle end is $f_w$.

14. A zoom lens, comprising, in order from an object side to an image side:
    a first lens unit having a negative refractive power;
    a second lens unit having a positive refractive power;
    a third lens unit having a negative refractive power and moving toward the image side during focusing from infinity to a short distance;
    a fourth lens unit having a negative refractive power; and
    a fifth lens unit having a positive refractive power,
    wherein intervals between adjacent lens units vary during at least one of zooming and focusing, and
    wherein conditional expressions $$3.5<f_{img}/f_w<10.0 \text{ and}$$

$$-5.0<f_f/f_w<-1.0$$

are satisfied where a focal length of the fifth lens unit is $f_{img}$, a focal length of the third lens unit is $f_f$, and a focal length of an entire system at a wide angle end is $f_w$.

15. A zoom lens, comprising, in order from an object side to an image side:
    a first lens unit having a negative refractive power;
    a second lens unit having a positive refractive power;
    a middle lens group including at least one lens unit; and
    a final lens unit having a positive refractive power,
    wherein the middle lens group comprises a focus lens unit that has a negative refractive power and moves toward the image side during focusing from infinity to a short distance, intervals between adjacent lens units vary during at least one of zooming and focusing, wherein the first lens unit comprises a first lens having a negative refractive power and a plastic aspheric lens having a negative refractive power in order from an object side to an image side, and wherein conditional expressions $3.5 < f_{img}/f_w < 10.0,$ $-5.0 < f_f/f_w < -1.0$ and $-9.0 < f_{asph}/f_w < -5.5$ are satisfied where a focal length of the final lens unit is $f_{img}$, a focal length of the focus lens unit is $f_f$, a focal length of an entire system at a wide angle end is $f_w$, and a focal length of the plastic aspheric lens is $f_{asph}$.

16. A zoom lens, comprising, in order from an object side to an image side:

a first lens unit having a negative refractive power;
a second lens unit having a positive refractive power;
a middle lens group including at least one lens unit; and
a final lens unit having a positive refractive power,
wherein the middle lens group comprises a focus lens unit that has a negative refractive power and moves toward the image side during focusing from infinity to a short distance, intervals between adjacent lens units vary during at least one of zooming and focusing, wherein the first lens unit comprises a first lens having a negative refractive power and a plastic aspheric lens having a negative refractive power in order from an object side to an image side, and wherein conditional expressions $3.5 < f_{img}/f_w < 10.0,$ $-5.0 < f_f/f_w < -1.0$ and $0.0001 < d_{asph}/TL < 0.01$ are satisfied where a focal length of the final lens unit is $f_{img}$, a focal length of the focus lens unit is $f_f$, a focal length of an entire system at a wide angle end is $f_w$, a distance between the first lens having a negative refractive power and the plastic aspheric lens having a negative refractive power along the optical axis is $d_{asph}$, and a distance from a lens surface of the first lens at an object side to an image plane along the optical axis is TL.

\* \* \* \* \*